United States Patent Office 3,480,527
Patented Nov. 25, 1969

3,480,527
PROCESS FOR PRODUCING p,p'-DINITROBIBEN-ZYL COMPOUNDS BY THE ELECTROREDUCTION OF SULFONIUM COMPOUNDS
Ritchie A. Wessling and William J. Settineri, Midland, Mich., assignors to Dow Chemical Company, Midland, Mich., a corporation of Delaware
No Drawing. Filed June 22, 1967, Ser. No. 647,896
Int. Cl. B01k 1/00
U.S. Cl. 204—73                                10 Claims

ABSTRACT OF THE DISCLOSURE

A process for preparing compounds having the formula

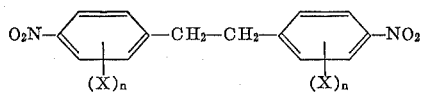

(e.g., p,p'-dinitrobibenzyl) by subjecting a solution in an electrolysis solvent (e.g. water or a polar organic solvent) of a sulfonium salt having the formula

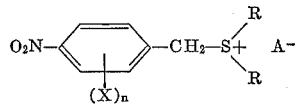

wherein X is a lower alkyl group, $n$ is an integer of from 0 to 4, R is an alkyl or hydroxyalkyl group, and $A^-$ is an electrolytically acceptable anion (typically an anion of a strong acid), to an electrical potential sufficient to reduce the sulfonium salt.

---

The resulting compounds are useful as intermediates in making diamines as described by Fuson et al., J.A.C.S., 75, 1325 (1953) and Yoke et al., J.A.C.S., 75, 2688 (1953).

FIELD OF THE INVENTION

The present invention relates to a novel process for the electroreduction of sulfonium salts to produce p,p'-dinitrobibenzyl compounds. More particularly, it relates to the electrochemical reduction of solutions of p-nitrobenzyldialkyl sulfonium salts and substituted p-nitrobenzyldialkyl sulfonium salts in electrolysis solvents to produce p,p'-dinitrobibenzyl and substituted p,p'-dinitrobibenzyl compounds.

As used herein, the term "electrolysis solvent" refers to water and those polar organic liquids conventionally employed as media for electrochemical synthesis.

DESCRIPTION OF THE PRIOR ART

The electrolytic preparation of p,p-dinitrobibenzyl in non-aqueous solvents from p-nitrobenzyl bromide is described by Klopman, Helv. Chim. Acta., 44, 1908 (1961).

The polarography, i.e., the electroreducibility of some sulfonium salts is known, as described for example by Colichman and Love, J. Org. Chem., 18, 40 (1953). However, the production of any useful material by the electroreduction of sulfonium salts has hitherto not been disclosed, nor has the production of p,p'-dinitrobibenzyl by electrochemical means from an aqueous solution.

SUMMARY OF THE INVENTION

It has now been discovered that solutions of certain sulfonium salts may be electrochemically reduced to prepare p,p'-dinitrobibenzyl and similar compounds. The compounds prepared by the process of this invention have the formula

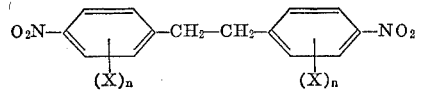

wherein X is a lower alkyl group and $n$ is an integer of from 0 to 4. They are prepared by subjecting a solution in an electrolysis solvent of a sulfonium salt having the formula

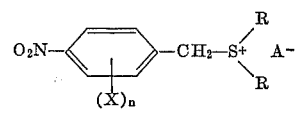

wherein X and $n$ are as defined above, R is, independently, in each case, an alkyl or hydroxyalkyl group (desirably containing from 1 to 20 carbon atoms and preferably from 1 to 4 carbon atoms) and $A^-$ is an electrolytically acceptable anion (typically an anion of a strong acid), to an electrical potential sufficient to reduce the sulfonium salt.

DETAILED DESCRIPTION OF THE INVENTION

Suitable specific examples of sulfonium salts for electrolytic reduction to produce p,p-dinitrobibenzyl compounds according to the process of this invention include p-nitrobenzyl sulfonium halide salts, such as p-nitrobenzyldimethyl sulfonium chloride, p-nitrobenzyldimethyl sulfonium bromide, p-nitrobenzyldiethyl sulfonium chloride, p-nitrobenzyldiethyl sulfonium bromide, p-nitrobenzyldi(hydroxyethyl)sulfonium chloride, and the like and p-nitrobenzyl sulfonium halide salts, such as methyl-p-nitrobenzyldimethyl sulfonium chloride, methyl-p-nitrobenzyldiethyl sulfonium bromide, diethyl-p-nitrobenzyldiethyl sulfonium chloride, tetraethyl-p-nitrobenzyldiethyl sulfonium chloride and the like; the corresponding fluoride, iodide, nitrate, tosylate, toluene sulfonate, perchlorate, and fluoroborate salts; and the like. The choice of anion depends mainly on the solubility characteristics of the salt thus formed in the particular solvent employed. The preferred sulfonium salt for electrolytic reduction in water according to the process of this invention is p-nitro-benzyldimethyl sulfonium chloride (PNBDMSC).

The above and other p-nitrobenzyl sulfonium salts suitable for electroreduction to produce p,p'-dinitrobibenzyl compounds according to the process of this invention may be prepared by methods known in the art, such as by reacting the corresponding p-nitrobenzyl halide with a dialkyl or di(hydroxyalkyl) sulfide. The preparation of sulfonium salts by this and other methods is reviewed in Reid, Organic Chemistry of Bivalent Sulfur, New York, Chemical Publishing Co., vol. II, 66–71 (1960), the disclosure of which is incorporated by reference herein.

It is preferred to carry out the electrolytic reduction of this invention in water as the solvent. Polar organic solvents, such as tetrahydrofuran; dimethyl formamide; dioxane; acetonitrile; dimethyl sulfoxide; hexamethyl phosphoramide; the lower alcohols, such as methanol, ethanol, and isopropanol; organic acids, such as acetic acid and acetic acid-benzene mixtures; mixtures of the above solvents; mixtures of the above organic solvents and water; and the like may also be used. The critical factors in the choice of solvent are the ion concentration level of the sulfonium salt that can be established in the solvent and the relative ease of reduction of the solvent and the sulfonium salt. Additionally, with a solvent in which the end product p,p'-dinitrobibenzyl compounds are soluble, some reduction to diamines will occur. With the preferred solvent, water, the p,p'-dinitrobibenzyl compounds are insoluble and precipitate from solution as they are formed. An additional advantage of employing water as the solvent is that the usual supporting electrolytes are often more readily soluble in water than in organic solvents.

Since the p-nitrobenzyl sulfonium salts are reduced at relatively low cathode potentials (usually from about −0.6 to about −0.8 volt versus saturated calomel electrode), the reduction of water or other solvent is usually not a problem. Thus, the cathode metals having a relatively low hydrogen overvoltage, such as nickel, platinum, copper, and the like, as well as the cathode metals having a relatively high hydrogen overvoltage, such as mercury, lead, zinc, tin, and the like, may be employed for the electrochemical reduction of these sulfonium compounds in water. Also, suitable non-metallic cathodes, such as graphite or organic conductors (usually in the form of a gel) may be used.

The process of this invention may either be carried out with a supporting electrolyte in the electrolysis solution or with the use of a sulfonium compound to be electrolytically reduced as its own supporting electrolyte. Any of the conventional supporting electrolytes, typically salts of strong acids, may be employed.

The use of the sulfonium compound as its own supporting electrolyte is particularly advantageous for continous processes. In a continuous process, as the concentration of the sulfonium compound is reduced due to the preparation of the corresponding p,p'-dinitrobibenzyl compound, additional sulfonium compound may be added to the solution in order to maintain the concentration level. The concentration of sulfonium compound in the solution is desirably maintained between about .01 and about 4 moles/liter. If a supporting electrolyte is used, it is generally added to the electrolysis solution in an amount from .1 to 4 moles/liter.

The current and voltage depend on the particular p-nitrobenzyl sulfonium compound to be reduced. The operating voltage is determined from the half wave reduction potential of the sulfonium compound to be reduced, usually on the ascending portion of the current-voltage plot. In the case of the preferred p-nitrobenzyl-dimethyl sulfonium chloride, a voltage of about —.6 volt (measured against SCE) is about 100 milliamp per 50 cm.$^2$ is preferred.

While the process may be operated at essentially any voltage and amperage within the range sufficient to reduce the sulfonium compounds but insufficient to reduce the electrolysis solvent, it is preferred to use controlled potential electrolysis. In this procedure, a potential (which may be determined by conventional polarographic measurements) selected for the particular sulfonium compound to be reduced is selected and maintained for the electrolysis. The technique of controlled potential electrolysis is explained in detail in Meites, "Controlled Potential Electrolysis" in A. Weissberger, ed., Technique of Organic Chemistry, vol. 1, 3rd ed. (Interscience, New York, 1959, pages 3281–3333), the disclosure of which is incorporated by reference herein.

For a typical controlled potential electrolysis, a three-compartment cell of the type described by Meites is employed. Such a cell was used for the examples set out below. In practice, the cathode compartment and contents are maintained in an inert gas atmosphere, such as argon or nitrogen, during the electrolysis. A direct current is supplied to the electrolysis cell with a variable potential difference between the anode and cathode in order to maintain the potential of the cathode surface at a chosen constant value as the concentration of electrolyte (either sulfonium compound or other supporting electrolyte) changes during the electrolysis. For a typical reduction of a sulfonium salt in which 0.5 normal KCl is used as the supporting electrolyte, the cell resistance is approximately 200 ohms.

In the following examples, the initial sulfonium ion concentration was about $10^{-2}$ moles per liter in a 0.5 normal supporting electrolyte (when used). The electrolysis cell was charged, purged of oxygen and the paddle wheel stirrer was adjusted for speed and depth of penetration into the mercury surface. A slowly increasing voltage ($V_T$) was applied. The critical or reducing voltage ($V_R$) at the mercury surface was observed with a vacuum tube volt meter, and it leveled off as the sulfonium salt began to be reduced. If the stirring and sulfonium salt concentration were high enough, $V_T$ could be further increased, resulting in a higher rate of electrolysis while the $V_R$ remained constant. When the sulfonium concentration dropped below a critical value (estimated to be approximately $10^{-3}$ moles per liter), $V_R$ would become larger if $V_T$ was not reduced. Therefore, $V_T$ was progressively lowered as the sulfonium concentration approached zero. Alternatively, additional sulfonium compound may be added to the electrolysis solution to maintain the sulfonium ion concentration above its critical value.

DESCRIPTION OF THE PREFERRED EMBODIMENTS

The following non-limiting examples represent preferred embodiments and describe the invention further.

Example 1.—p,p'-Dinitrobibenzyl p-Nitrobenzyl chloride was reacted with dimethyl sulfide in water in a stirred flask at 25°–30° C. to give pNBDMSC. A quantity of 17 g. of p-nitrobenzyl chloride and 25 g. of dimethyl sulfide were charged to 100 ml. of an 85 weight percent methyl alcohol —15 weight percent water solution and stirred for 72 hours, followed by the addition of 185 ml. of distilled water. The resulting solution was extracted four times with an equal volume of methylene chloride, and the solution was then evaporated to approximately one-half volume. The resulting solution can be titrated for chloride (and hence sulfonium) concentration and was diluted for the following runs. The aqueous solution was electrolyzed in a 3-compartment preparative electrolysis cell using a stirred mercury cathode and carbon anode according to the procedure described above, under the conditions set forth in Table I, to give a 95 percent yield of p,p'-dinitrobibenzyl, which had a melting point of from 180°–185° C., compared with literature values of from 180–182° C.

TABLE I.—ELECTROLYSIS OF p-NITROBENZYL DIMETHYL SULFONIUM CHLORIDE

| | |
|---|---|
| Sulfonium salt conc., moles, liter | $8.4 \times 10^{-3}$ |
| Catholyte pH | 5.0 |
| Cathode voltage (versus saturated calomel electrode) | —0.61 |
| Product isolated | 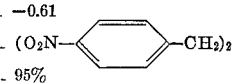 |
| Yield | 95% |
| Melting point of product | 180–185° C. |
| Faradays passed during electrolysis | $2.21 \times 10^{-3}$ |
| Current variation | 100 ma.–~2 ma. |
| Electrons passed per sulfonium reacted | 1.14 |
| Supporting electrolyte | KCl-0.5 N |

Substitution of the corresponding bromide, nitrate, toluene sulfonate, perchlorate or fluoroborate salt gives similar results. If an alkyl-substituted p-nitrobenzyl sulfonium salt is employed in the above procedure, the corresponding alkyl-substituted p,p'-dinitrobibenzyl compound is produced.

When meta-nitrobenzyldimethyl sulfonium chloride was substituted in equivalent amount for the pNBDMSC in the above procedure, no m,m'-dinitrobibenzyl, the expected product, was observed. Since no dimethyl sulfide odor was observed, the sulfonium group probably was not reduced.

Example 2.—p,p'-Dinitrobibenzyl (copper and platinum cathode)

An aqueous solution $4 \times 10^{-2}$ molar in pNBDMSC and 0.5 molar in KCl was placed in a beaker equipped with a carbon rod anode and a copper or platinum cathode. By carefully applying voltage and stirring the cathode vigorously in the solution, a yellow compound having a melting point in agreement with that produced in Example 1 was obtained. The observed cathode potential against a saturated calomel electrode for these preparations was between —0.6 and —0.8 volt.

Substitution of a higher alkyl sulfonium salt, such as p-nitrobenzyldioctyl sulfonium chloride, in the electroreduction procedure of Example 1 also gives p,p'-dinitrobibenzyl product.

What is claimed is:

1. A process for preparing a compound having the formula

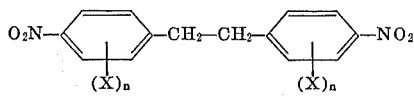

wherein X is a lower alkyl group, and $n$ is an integer from 0 to 4, which comprises subjecting a solution in an electrolysis solvent of a sulfonium salt having the formula

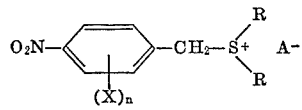

wherein X and $n$ are as defined above, R is, independently in each case, an alkyl or hydroxyalkyl group, an dA$^-$ is an electrolytically acceptable anion to an electrical potential sufficient to reduce the sulfonium salt.

2. The process of claim 1 wherein $n$ is 0.

3. The process of claim 1 wherein each R is a methyl group.

4. The process of claim 1 wherein A$^-$ is a halogen.

5. The process of claim 4 wherein $n$ is 0.

6. The process of claim 1 wherein the electrolysis solvent is water and the sulfonium salt is subjected to the electrical potential in the presence of a mercury, copper or platinum cathode.

7. The process of claim 6 wherein $n$ is 0.

8. The process of claim 6 wherein R is a methyl group.

9. The process of claim 6 wherein A$^-$ is a halogen.

10. The process of claim 9 wherein $n$ is 0.

References Cited

UNITED STATES PATENTS 3,399,124    8/1968    Gilch _____ 204—72

JOHN H. MACK, Primary Examiner

H. M. FLOURNOY, Assistant Examiner

U.S. Cl. X.R.

204—59